(12) United States Patent
Lee

(10) Patent No.: US 9,392,147 B2
(45) Date of Patent: Jul. 12, 2016

(54) CAMERA MODULE HAVING ELASTIC STIFFENING MATERIAL FOR EFFICIENT SHOCK ABSORBING PROPERTY AND METHOD FOR MANUFACTURING THE SAME

(75) Inventor: Kiho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 167 days.

(21) Appl. No.: 13/988,237

(22) PCT Filed: Nov. 10, 2011

(86) PCT No.: PCT/KR2011/008538
§ 371 (c)(1),
(2), (4) Date: May 17, 2013

(87) PCT Pub. No.: WO2012/067377
PCT Pub. Date: May 24, 2012

(65) Prior Publication Data
US 2013/0242183 A1    Sep. 19, 2013

(30) Foreign Application Priority Data

Nov. 18, 2010 (KR) .................. 10-2010-0115144
Nov. 22, 2010 (KR) .................. 10-2010-0116417
Dec. 6, 2010 (KR) .................. 10-2010-0123653
Dec. 13, 2010 (KR) .................. 10-2010-0127054

(51) Int. Cl.
*H04N 5/225* (2006.01)
*G03B 17/02* (2006.01)

(52) U.S. Cl.
CPC .............. *H04N 5/2252* (2013.01); *G03B 17/02* (2013.01); *H04N 5/2253* (2013.01); *H04N 5/2257* (2013.01); *Y10T 29/49128* (2015.01)

(58) Field of Classification Search
None
See application file for complete search history.

(56) References Cited

U.S. PATENT DOCUMENTS

2004/0263668 A1* 12/2004 Kim .................. H01L 27/14618
                                                           348/340
2006/0023109 A1*  2/2006 Mabuchi et al. .............. 348/340
(Continued)

FOREIGN PATENT DOCUMENTS

CN    1330487 A    1/2002
CN    1778101 A    5/2006
(Continued)

OTHER PUBLICATIONS

Office Action dated May 25, 2012 in Korean Application No. 10-2010-0123653, filed Dec. 6, 2010.
(Continued)

*Primary Examiner* — Shahbaz Nazrul
(74) *Attorney, Agent, or Firm* — Saliwanchik, Lloyd & Eisenschenk

(57) ABSTRACT

The present invention relates to a camera module, the camera module including: a PCB (Printed Circuit Board), an image sensor mounted on the PCB and formed with an imaging device for converting light to an electrical signal; a housing fixed a bottom end to an upper surface of the PCB, the housing being a case formed with a hole at an upper center and having a bottom-opened inner space: a lens assembly having at least one lens aligned to the lens hole by being positioned at and contacted to an upper surface of the image sensor and accommodated at an inner space of the housing; and an elastic stiffening material inserted between a lens hole periphery at an upper inner side of the housing and an upper edge of the lens assembly.

15 Claims, 5 Drawing Sheets

(56) References Cited

U.S. PATENT DOCUMENTS

| | | |
|---|---|---|
| 2006/0082658 A1 | 4/2006 | Lee et al. |
| 2006/0208182 A1 | 9/2006 | Tsukamoto et al. |
| 2007/0047952 A1* | 3/2007 | Kim et al. .................... 396/542 |
| 2007/0165136 A1* | 7/2007 | Wu et al. ....................... 348/373 |
| 2007/0269205 A1* | 11/2007 | Lee ....................... G03B 17/02 396/542 |
| 2008/0050943 A1* | 2/2008 | Ho .................... H01L 27/14618 439/68 |
| 2008/0278621 A1 | 11/2008 | Cho et al. |
| 2008/0297645 A1* | 12/2008 | Lo et al. ....................... 348/340 |
| 2009/0128681 A1 | 5/2009 | Kim |
| 2011/0262121 A1* | 10/2011 | Yanagisawa et al. ........... 396/55 |
| 2012/0170125 A1* | 7/2012 | Han .............................. 359/601 |
| 2012/0224075 A1* | 9/2012 | Lim et al. ................. 348/208.11 |
| 2014/0043496 A1* | 2/2014 | Azuma ..................... 348/208.7 |

FOREIGN PATENT DOCUMENTS

| | | | |
|---|---|---|---|
| CN | 1870725 A | | 11/2006 |
| CN | 101441309 A | | 5/2009 |
| CN | 101878443 A | | 11/2010 |
| EP | 2234465 A1 | | 9/2010 |
| JP | 2004-153855 A | | 5/2004 |
| JP | 2006-245246 A | | 9/2006 |
| KR | 10-2008-0085444 A | | 9/2008 |
| KR | 10-2009-0036754 A | | 4/2009 |
| KR | 10-0957384 B1 | | 5/2010 |
| WO | 2010044212 | * | 4/2010 |

OTHER PUBLICATIONS

International Search Report in International Application No. PCT/KR2011/008538, filed Nov. 10, 2011.

Partial European Search Report dated May 20, 2015 in European Application No. 11842321.9.

Office Action dated Jan. 4, 2016 in Chinese Application No. 201180055610.6.

* cited by examiner

CAMERA MODULE HAVING ELASTIC STIFFENING MATERIAL FOR EFFICIENT SHOCK ABSORBING PROPERTY AND METHOD FOR MANUFACTURING THE SAME

CROSS-REFERENCE TO RELATED APPLICATIONS

This application is the U.S. national stage application of International Patent Application No. PCT/KR2011/008538, filed Nov. 10, 2011, which claims priority to Korean Application No. 10-2010-0115144, filed Nov. 18, 2010; 10-2010-0116417, filed Nov. 22, 2010; 10-2010-0123653, filed Dec. 6, 2010; and 10-2010-0127054, filed Dec. 13, 2010, the disclosures of each of which are incorporated herein by reference in their entirety.

TECHNICAL FIELD

Teachings in accordance with the exemplary embodiments of this invention relate generally to a camera module.

BACKGROUND ART

Recently, demands on a small-sized compact camera module are on the increase for use in various multimedia fields including notebook type personal computers, camera phones, PDAs (Personal Digital Assistants), smart phones and toys, and in image input equipment including monitoring cameras and information terminals for video tape recorders. Particularly, designs have become such elements that have a great influence on sales of mobile phones, whereby small-sized camera modules are greatly on demand.

The camera module is generally manufactured using an image sensor or a photo-electric conversion device of a CCD (Charge Coupled Apparatus) type or a CMOS (Complementary Metal Oxide Semiconductor) type to converge light from an object to a photosensitive element and to form an image of the object.

FIG. 1 is a cross-sectional view illustrating a camera module according to prior art, from which the camera module according to prior art will be briefly described.

Referring to FIG. 1, a PCB (Printed Circuit Board, 10) is mounted with an image sensor (20), and a lens assembly (30) mounted with a plurality of lenses on a light irradiation path is positioned at an upper surface of the image sensor (20). Furthermore, a housing (40) is also mounted for supporting the lens assembly (30).

The lens assembly (30) in the conventional camera module is bonded to an upper periphery of the PCB (10) by an adhesive to allow light to be irradiated from the plurality of lenses to the image sensor (20). On the drawing, an adhesive (50)) is coated to a bottom surface of the lens assembly (30) or an upper surface of the PCB (10) to fix the lens assembly (30), where there occurs the following problems in a case the adhesive (50) of conventional epoxy is coated to the bottom surface of the lens assembly (30) or the upper surface of the PCB (10).

That is, a relatively even coated thickness must be applied, but if no even thickness is coated, a vertical tilting is generated from the bonded lens assembly (30) to ill affect a resolution, whereby the adjacent image sensor (20) on the PCB (10) is applied with a physical influence during curing of the coated epoxy to ill affect the resolution of the image sensor (20).

Another problem is that a direct contact between the lens assembly (30) and the PCB (10) may cause a physical damage to the lens assembly (30). Still another problem is that the conventional camera module is directly exposed to outside shock due to not being equipped with a structure or a means to reduce or eliminate the outside shock if the outside shock is applied. Still further problem is that a coated surface is too narrow to weaken an adhesive strength and a product defect occurs if epoxy is introduced into the image sensor.

DISCLOSURE OF INVENTION

Technical Problem

In order to resolve the above-mentioned problems and/or disadvantages, the present invention is disclosed to provide a camera module configured to evenly maintain a pressure to a lens of a lens assembly and an image sensor to reduce an outside shock. The present invention is also disclosed to provide a camera module configured to allow a mounting height of a lens assembly coupled to a PCB to be evenly assembled and to easily align an accurate optical axis.

The present invention is further disclosed to provide a camera module configured to prevent damage to an image sensor when mounted to a PCB and to easily align an optical axis. The present invention is still further disclosed to provide a camera module configured to prevent damage to an image sensor and to easily align an optical axis.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a PCB (Printed Circuit Board), an image sensor mounted on the PCB and formed with an imaging device for converting light to an electrical signal; a housing fixed a bottom end to an upper surface of the PCB, the housing being a case formed with a hole at an upper center and having a bottom-opened inner space; a lens assembly having at least one lens aligned to the lens hole by being positioned at and contacted to an upper surface of the image sensor and accommodated at an inner space of the housing; and an elastic stiffening material inserted between a lens hole periphery at an upper inner side of the housing and an upper edge of the lens assembly.

Preferably, at least a part of the elastic stiffening material of lens assembly is fixedly adhered to an inner upper side of the housing.

Preferably, the elastic stiffening material of lens assembly is inserted between an inner wall of the housing and an outer wall of the lens assembly.

Preferably, at least a part of the elastic stiffening material of lens assembly is fixedly adhered to the inner wall of the housing.

Preferably, the elastic stiffening material of lens assembly is a soft epoxy or a sponge.

In another general aspect of the present invention, there is provided a camera module, the camera module comprising: a PCB (Printed Circuit Board), an image sensor mounted on the PCB and formed with an imaging device for converting light to an electrical signal; a housing fixed a bottom end to an upper surface of the PCB, the housing being a case formed with a hole at an upper center and having a bottom-opened inner space; a lens assembly having at least one lens aligned to the lens hole by being positioned at and contacted to an upper surface of the image sensor and accommodated at an inner space of the housing; wherein an outer bottom end of the lens assembly is formed with a hollow hole filled with an adhesive.

Preferably, a bottom surface of the lens assembly and an upper surface of the image sensor are at least partially surface-contacted, and are mutually adhered by an adhesive infused into the hollow hole.

Preferably, the adhesive filled at the outer bottom end of the lens assembly is epoxy.

Preferably, a plurality of hollow holes is formed along a periphery of the outer bottom end of the lens assembly, each hollow hole being discrete from each other.

Preferably, a plurality of hollow holes is continuously formed along a periphery of the outer bottom end of the lens assembly.

In still another general aspect of the present invention, there is provided a camera module, the camera module comprising: a PCB formed with a light transmission opening unit; an image sensor having a larger plane surface than the light transmission opening unit of the PCB, with an upper edge being attached to a bottom surface of an edge of the light transmission opening unit at the PCB; and a lens assembly having a larger plane surface than the light transmission opening unit of the PCB, with a bottom edge being attached to an upper surface of an edge of the light transmission opening unit of the PCB.

Preferably, the camera module is further comprising a housing accommodated in the lens assembly and fixed a bottom end to an upper surface of the PCB, the housing being a case formed with a hole at an upper center and having a bottom-opened inner space.

Preferably, the PCB and the lens assembly are mutually adhered by an adhesive.

Preferably, the adhesive is an epoxy.

Preferably, the PCB and the image sensor are mutually adhered by using a stud bump bonding, a wire bonding, an ADF (Anisotropic Conductive Film) or a hot bar.

Preferably, the PCB is an FR4 (Flame Retardant Type 4) PCB.

In still another general aspect of the present invention, there is provided a camera module including an image sensor, a PCB and a lens assembly, the camera module wherein the PCB has a dual staircase sill structure in which a first receiving unit is formed at an upper surface and a second receiving unit is formed at an upper side higher than the first receiving unit with a receiving area larger than that of the first receiving unit, the image sensor is accommodated and assembled at the first receiving unit, and a bottom end of the lens assembly is inserted into and accommodated at the second receiving unit.

Preferably, a thickness of the image sensor is thinner than a depth of the first receiving unit.

Preferably, the camera module is further comprising a housing accommodated in the lens assembly and fixed a bottom end to an upper surface of the PCB, the housing being a case formed with a hole at an upper center and having a bottom-opened inner space.

Preferably, a horizontal surface at a staircase sill of the second receiving unit and a bottom surface of the lens assembly are coated with an adhesive for mutual attachment.

Preferably, a vertical surface at a staircase sill of the second receiving unit and an outer wall surface of the bottom surface of the lens assembly are coated with an adhesive for mutual attachment.

Preferably, the adhesive is an epoxy.

Preferably, the image sensor is accommodated into the first receiving unit and attached to the first receiving unit by a wire bonding.

Preferably, the PCB is an LTCC (Low Temperature Co-Fired Ceramics) PCB or an HTCC (High Temperature Co-Fired Ceramics) PCB.

In still further general aspect of the present invention, there is provided a camera module including an image sensor, a PCB and a lens assembly, the camera module wherein the PCB has a triple staircase sill structure in which a first receiving unit is formed at an upper surface and a second receiving unit is formed at an upper side higher than the first receiving unit with a receiving area larger than that of the first receiving unit, and a third receiving unit having a receiving area larger than that of second receiving unit, the image sensor is accommodated and assembled at the first receiving unit, and a bottom end of the lens assembly is inserted into the second receiving unit, and a vertical surface at a staircase sill of the second receiving unit and an outer wall surface of the bottom surface of the lens assembly are coated with an adhesive, and a remnant of the adhesive is accommodated into the third receiving unit for mutual attachment.

Preferably, the adhesive is an epoxy.

In still further general aspect of the present invention, there is provided a method for manufacturing a camera module, the method comprising: mounting an image sensor on a PCB; mounting a lens assembly positioned at and contacted to an upper surface of the image sensor and formed with a hollow hole at a bottom end of an outer wall for filling an adhesive; fixing the image sensor and the lens assembly by infusing the adhesive into the hollow hole formed at the bottom end of the outer wall of the lens assembly; and fixing, at an upper surface of the PCB, a bottom end of a housing mounted with a hole at an upper center and having a bottom-opened inner space.

Preferably, the adhesive infused at the fixing stage of the lens assembly is an epoxy.

In still further general aspect of the present invention, there is provided a method for manufacturing a camera module, the method comprising: preparing a PCB having a dual staircase sill structure in which a first receiving unit is formed at an upper surface and a second receiving unit is formed at an upper side higher than the first receiving unit with a receiving area larger than that of the first receiving unit; attaching an image sensor to a bottom surface of the first receiving unit; coating an adhesive to a staircase sill of the second receiving unit of the PCB; inserting a lens assembly into the second receiving unit of the PCB coated with the adhesive for mutual attachment; preparing a housing formed with a center hole at an upper center and having a bottom-opened inner space, aligning an optical axis of the lens assembly on the center hole to fix a bottom end to an upper surface of the PCB.

Preferably, the image sensor is attached to the image sensor by a wire bonding in the stage of attaching the image sensor.

Preferably the staircase sill of the second receiving includes a vertical surface and a horizontal surface, and the adhesive is coated to the horizontal surface of the staircase sill in the stage of coating the adhesive.

Preferably the staircase sill of the second receiving includes a vertical surface and a horizontal surface, and the adhesive is coated to the vertical surface of the staircase sill in the stage of coating the adhesive.

Preferably, the adhesive is an epoxy.

Advantageous Effects of Invention

The camera module according to the present invention has an advantageous effect in that a pressure to a lens of a lens assembly and an image sensor is evenly applied to reduce an outside shock. The camera module according to the present invention has another advantageous effect in that an adhesive can be infused into a hollow hole to enable a fixation by the adhesive by directly surface-contacting a bottom surface of a lens assembly and an upper surface of an image sensor to even a mounting height. The camera module according to the present invention has a still another advantageous effect in that damage to an image sensor caused by contact between a lens assembly and an image sensor is prevented by an indirect contact between the lens assembly and the image sensor, and an optical axis is easily aligned. The camera module according to the present invention has a still further advantageous effect in that damage to an image sensor caused by contact between a lens assembly and an image sensor is prevented by an indirect contact between the lens assembly and the image sensor, and a receiving unit is arranged to enable an easy optical alignment.

Various aspects and embodiments of the invention are described in further detail below.

The technical solution is neither intended nor should it be construed as being representative of the full extent and scope of the present invention, which these and additional aspects will become more readily apparent from the detailed description, particularly when taken together with the appended drawings. As mentioned above, the technical solution is not an extensive overview and is not intended to identify key or critical elements of the apparatuses, methods, systems, processes, and the like, or to delineate the scope of such elements. The technical solution provides a conceptual introduction in a simplified form as a prelude to the more-detailed description that follows.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
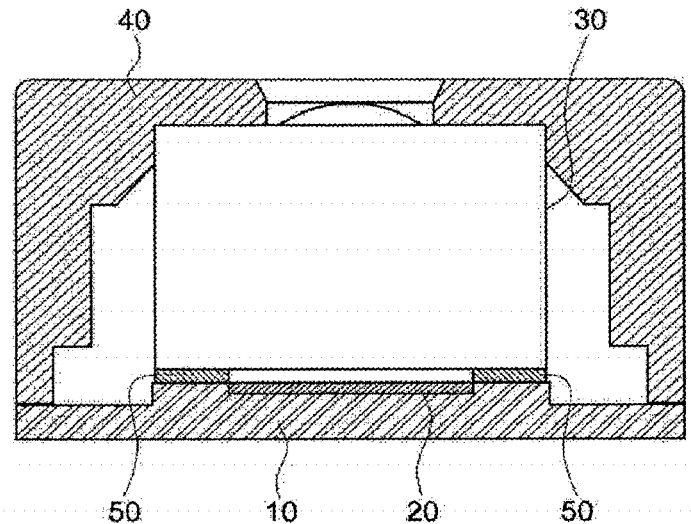
FIG. 1 is a cross-sectional view of a camera module according to prior art.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-12 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes", "including", "have" and/or "having" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

Figure 2:
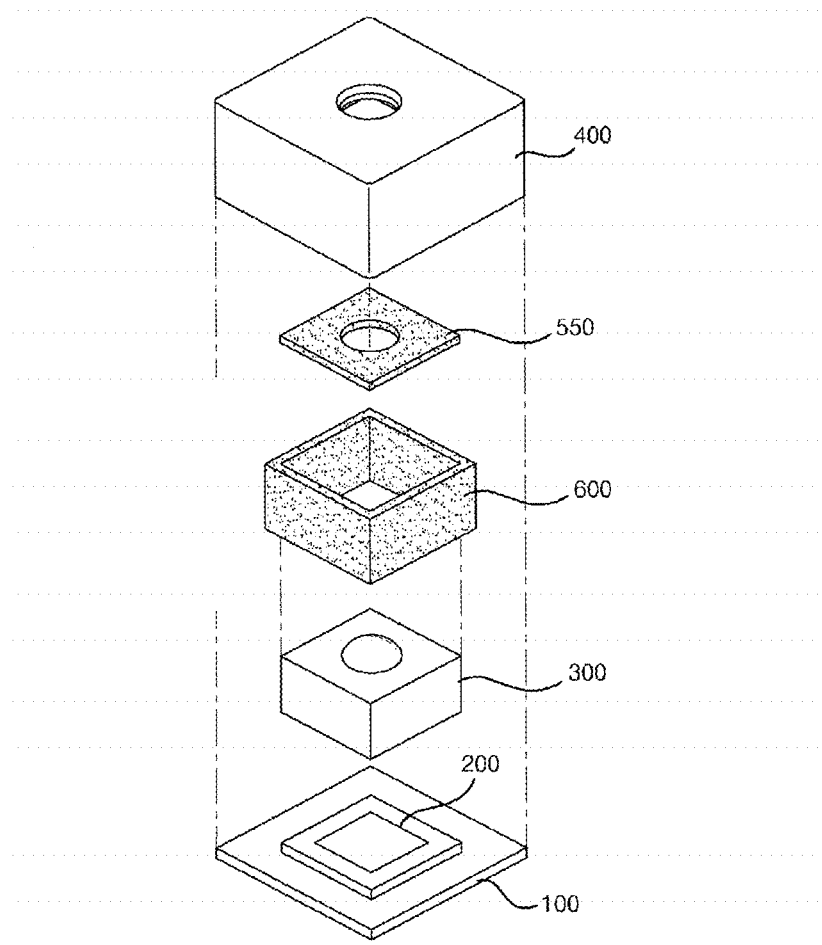
FIG. 2 is an exploded perspective view of a camera module according to a first exemplary embodiment of the present invention.
Figure 3:
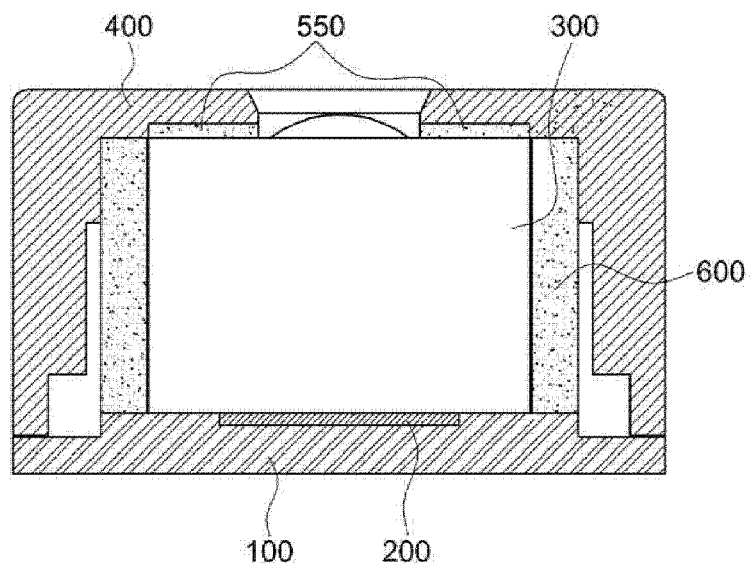
FIG. 3 is a cross-sectional view of a camera module according to a first exemplary embodiment of the present invention.

FIG. 2 is an exploded perspective view of a camera module according to a first exemplary embodiment of the present invention, and FIG. 3 is a cross-sectional view of a camera module according to a first exemplary embodiment of the present invention.

Referring to FIGS. 2 and 3, a camera module according to the first exemplary embodiment of the present invention may include a PCB (100), an image sensor (200), a lens assembly (300), a housing (400) and elastic stiffening materials (550, 600).

The PCB (100, Printed Circuit Board),) is mounted with the image sensor (200) and coupled to a bottom surface of the housing (400) to fix the housing (400). The image sensor (200) is formed with an imaging device for converting light incident through a lens existing on the lens assembly (300) contacting an upper surface of the image sensor to an electrical signal.

The lens assembly (300) includes at least one or more lenses accommodated inside an inner space of the housing (400) to be aligned at a lens hole formed at an upper surface of the housing (300). The housing (400), the housing, being a case formed with a hole at an upper center and having a bottom-opened inner space, accommodates the lens assembly (300) and elastic stiffening materials (550, 600) inside the inner space.

The elastic stiffening materials (550, 600) include an upper stiffening material (550) and a lateral elastic stiffening material (600). The upper stiffening material (550) inserted between a lens hole periphery at an upper inner side of the housing (400) and an upper edge of the lens assembly (300) serves to evenly maintain a pressure applied between the lens of the lens assembly (300) and the image sensor (200), thereby being conducive to stabilizing a resolution.

The lateral elastic stiffening material (600) is installed between an outer wall of the lens assembly (300) and an inner wall of the housing (400) to reduce a shock from a dropping and an outside shock. Furthermore, the upper stiffening material (550) and the lateral elastic stiffening material (600) may include a soft epoxy, a sponge and a Poron (a fine pitch open cell urethane foam produced by Rogers Corporation) sponge. However, the materials are not limited thereto, and any soft material capable of reducing shocks may be utilized.

Figure 4:
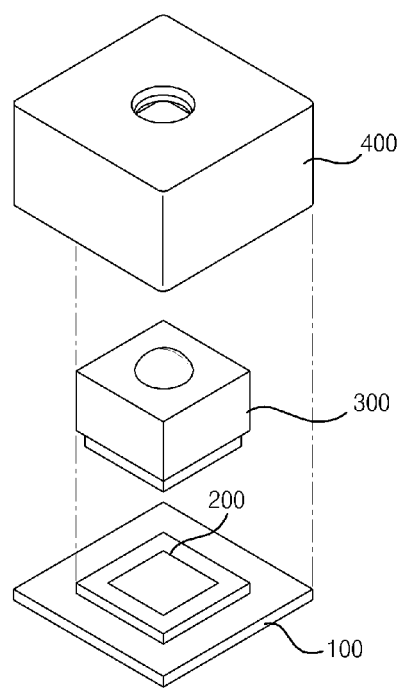
FIG. 4 is an exploded perspective view of a camera module according to a second exemplary embodiment of the present invention.
Figure 5:
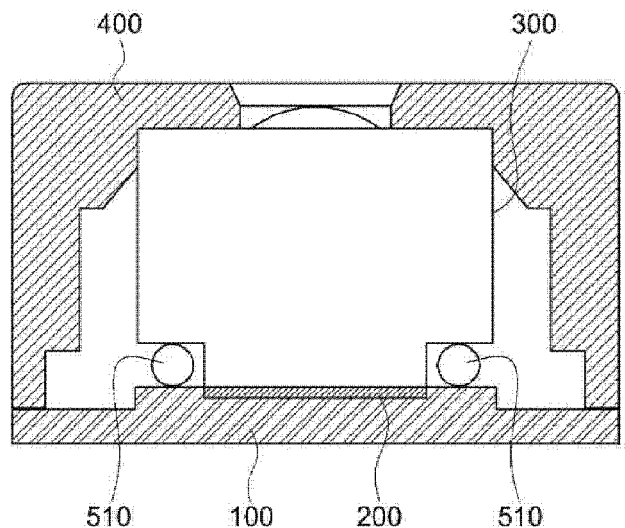
FIG. 5 is a cross-sectional view of a camera module according to a second exemplary embodiment of the present invention.

FIG. 4 is an exploded perspective view of a camera module according to a second exemplary embodiment of the present invention, and FIG. 5 is a cross-sectional view of a camera module according to a second exemplary embodiment of the present invention.

Referring to FIGS. 4 and 5, the camera module according to a second exemplary embodiment of the present invention may include a PCB (100), an image sensor (200), a lens assembly (300) and a housing (400).

The PCB (100, Printed Circuit Board),) is mounted with the image sensor (200) and coupled to a bottom surface of the housing (400) to fix the housing (400). The image sensor (200) is formed with an imaging device for converting light incident through a lens existing on the lens assembly (300) contacting an upper surface of the image sensor to an electrical signal.

The lens assembly (300) includes at least one or more lenses accommodated inside an inner space of the housing (400) to be aligned at a lens hole formed at an upper surface of the housing (300), and is formed at an outer bottom end of the lens assembly with a hollow hole filled with an adhesive.

A bottom surface of the lens assembly (300) and an upper surface of the image sensor (200) are at least partially surface-contacted, and are mutually attached by the adhesive infused into the hollow hole. The adhesive filled at the outer bottom end of the lens assembly may be epoxy, but it should be apparent that the material is not limited to the epoxy.

A plurality of hollow holes is formed along a periphery of the outer bottom end of the lens assembly (300), each hollow hole being discrete from each other or being continuously formed along a periphery of the outer bottom end of the lens assembly.

A method for manufacturing a camera module according to an exemplary embodiment of the present invention may include: mounting an image sensor (200) on a PCB (100); mounting a lens assembly (300) positioned at and contacted to an upper surface of the image sensor (200) and formed with a hollow hole at a bottom end of an outer wall for filling an adhesive; fixing the image sensor (200) and the lens assembly (300) by infusing the adhesive into the hollow hole formed at the bottom end of the outer wall of the lens assembly (300); and fixing, at an upper surface of the PCB (100), a bottom end of a housing (400) mounted with a hole at an upper center and having a bottom-opened inner space, where the adhesive that is infused in the fixing stage of the lens assembly (300) may be epoxy, but it should be apparent that the material is not limited to the epoxy.

Figure 6:
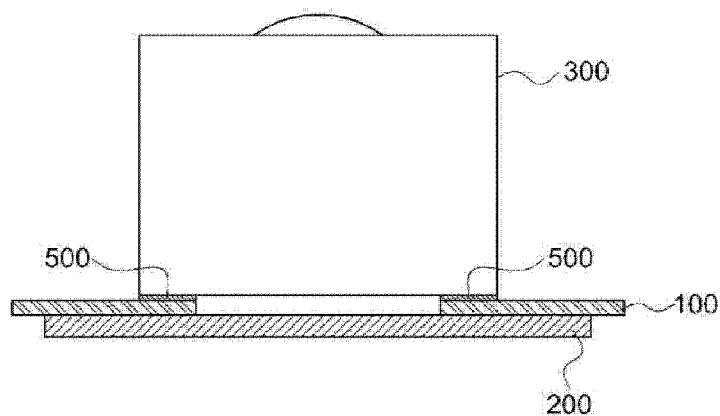
FIG. 6 is a cross-sectional view of a camera module according to a third exemplary embodiment of the present invention.
Figure 7:
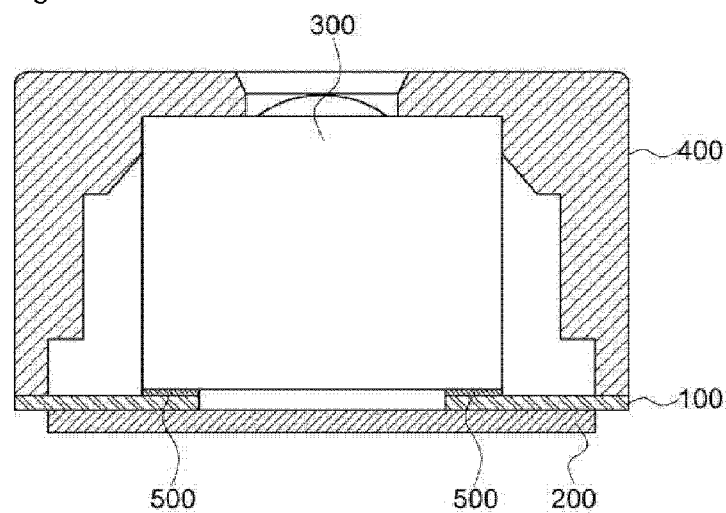
FIG. 7 is a cross-sectional view of another camera module according to a third exemplary embodiment of the present invention.

FIG. 6 is a cross-sectional view of a camera module according to a third exemplary embodiment of the present invention, and FIG. 7 is a cross-sectional view of another camera module according to a third exemplary embodiment of the present invention.

Referring to FIG. 6, the camera module according to a third exemplary embodiment of the present invention may include a PCB (100), an image sensor (200), a lens assembly (300) and may further include a housing (400) with reference to FIG. 7.

The PCB (100) is formed with a light transmission opening unit and may use an FR4 (Flame Retardant Type 4) PCB. However, but it should be apparent that the PCB is not limited to the FR4PCB.

The image sensor (200) is formed with an imaging device for converting light incident through a lens existing on the lens assembly (300) contacting an upper surface of the image sensor to an electrical signal, and has a larger plane surface than the light transmission opening unit of the PCB, with an upper edge being attached to a bottom surface of an edge of the light transmission opening unit at the PCB, where the PCB (100) and the image sensor (200) are mutually adhered by using a stud bump bonding, a wire bonding, an ADF (Anisotropic Conductive Film) or a hot bar.

The lens assembly (300) has a larger plane surface than the light transmission opening unit of the PCB (100), with a bottom edge being attached to an upper surface of an edge of the light transmission opening unit of the PCB (100), where the adhesive may be epoxy, but it should be apparent that the material is not limited to the epoxy.

The lens assembly (300) is attached to an upper surface of the PCB (100) and the image sensor (200) is attached to a bottom surface of the PCB (100), which makes the lens assembly (300) and the image sensor (200) face each other with the opening of the PCB (100) in between, such that the lens assembly (300) and the image sensor (200) are discrete as much as thickness of the PCB (100) to prevent a bottom surface of the lens assembly (300) from directly touching an upper surface of the image sensor (200) and to allow maintaining a predetermined gap. Thus, damage to the image sensor (200) caused by contact with the bottom surface of the lens assembly (300) and the image sensor (200) can be effectively avoided.

Referring to FIG. 7, the housing, being a case formed with a hole at an upper center and having a bottom-opened inner space, is accommodated into the lens assembly (300) and fixed a bottom end to an upper surface of the PCB (100).

Figure 8:
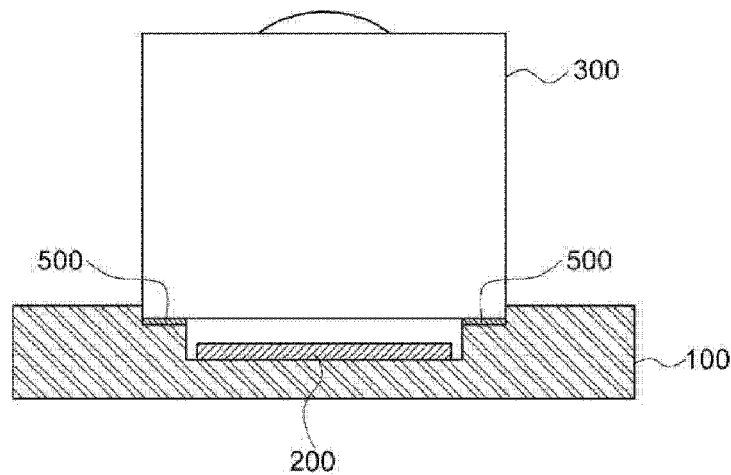
FIG. 8 is a cross-sectional view of a camera module according to a fourth exemplary embodiment of the present invention.
Figure 9:
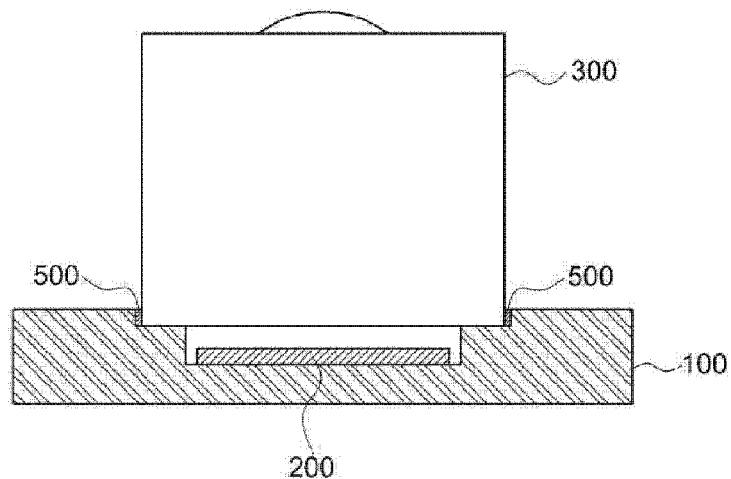
FIG. 9 is a cross-sectional view of another camera module according to a fourth exemplary embodiment of the present invention.
Figure 10:
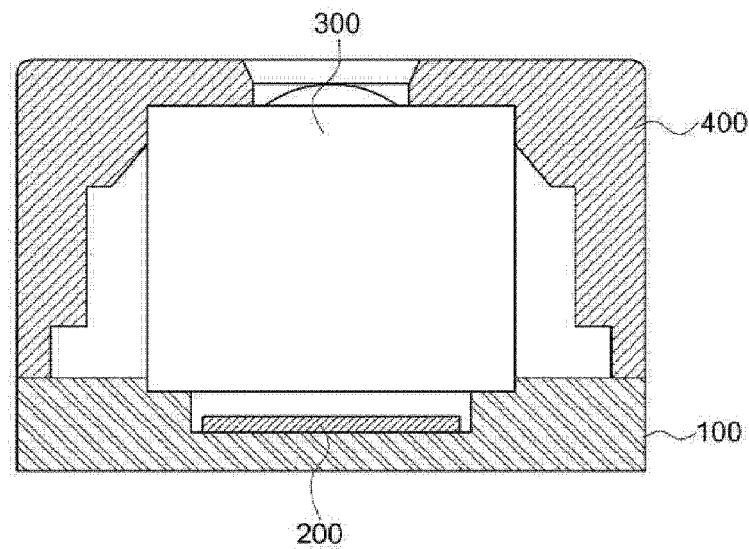
FIG. 10 is a cross-sectional view of still another camera module according to a fourth exemplary embodiment of the present invention.

FIG. 8 is a cross-sectional view of a camera module according to a fourth exemplary embodiment of the present invention, FIG. 9 is a cross-sectional view of another camera module according to a fourth exemplary embodiment of the present invention, and FIG. 10 is a cross-sectional view of still another camera module according to a fourth exemplary embodiment of the present invention.

The camera module according to a fourth exemplary embodiment of the present invention may include a PCB (100), an image sensor (200), a lens assembly (300) and may further include a housing (400) with reference to FIG. 10.

The PCB (100) has a dual staircase sill structure at an upper surface in which a first receiving unit is formed at an upper surface and a second receiving unit is formed at an upper side higher than the first receiving unit with a receiving area larger than that of the first receiving unit. The staircase sill of the second receiving includes a vertical surface and a horizontal surface. The PCB (100) may be an LTCC (Low Temperature Co-Fired Ceramics) PCB or an HTCC (High Temperature Co-Fired Ceramics) PCB. However, the PCB (100) is not limited thereto.

The image sensor (200) is formed with an imaging device for converting light incident through a lens existing on the lens assembly (300) contacting an upper surface of the image sensor to an electrical signal, and accommodated into the first receiving unit of the PCB (100) and attached thereto by way of wire bonding. However, the attachment method is not limited to the wire bonding and other methods than the wire bonding may be utilized.

A bottom surface of the lens assembly (300) and a horizontal surface of the staircase sill of the second receiving unit of the PCB (100) are coated with an adhesive for mutual attachment, where the lens assembly (300) is guided by the staircase sill of the second receiving unit of the PCB (100) to minimize a shifted amount of the lens assembly (300).

Furthermore, an outer wall surface of the lens assembly (300) and the vertical surface of the staircase sill of the second receiving unit of the PCB (100) are coated with an adhesive for mutual attachment to minimize the shifted amount of the lens assembly (300) and to enable a control of a small image height margin that causes a problem to an un-adjustable type lens assembly (300) through a mechanical guide.

As mentioned above, although the mutual attachment between the PCB (100) and the lens assembly (200) may be enabled by selecting one surface of the vertical surface and the horizontal surface of the staircase sill at the second receiving unit and coating the adhesive to the selected one surface, both the vertical surface and the horizontal surface of the staircase sill at second receiving unit may be coated with adhesive for mutual attachment between the PCB (100) and the lens assembly (300), where the adhesive may be epoxy, but it should be apparent that the material is not limited to the epoxy.

The image sensor (200) is assembled on the first receiving unit of the PCB (100), and the lens assembly (300) is coupled to the second receiving unit of the PCB (100), such that the PCB (100) forms a dual staircase structure in which the second receiving unit is formed at an upper surface of the first receiving unit, and a thickness of the image sensor (200) is thinner than a depth of the first receiving unit, whereby the lens assembly (300) and the image sensor (200) are discrete as much as thickness of the PCB (100) to prevent a bottom surface of the lens assembly (300) from directly touching an upper surface of the image sensor (200) and to allow maintaining a predetermined gap. Thus, damage to the image sensor (200) caused by contact with the bottom surface of the lens assembly (300) and the image sensor (200) can be effectively avoided.

Referring to FIG. 10, the housing (400), being a case formed with a hole at an upper center and having a bottom-opened inner space, is accommodated into the lens assembly (300) and fixed a bottom end to an upper surface of the PCB (100).

Mode for the Invention

Figure 11:
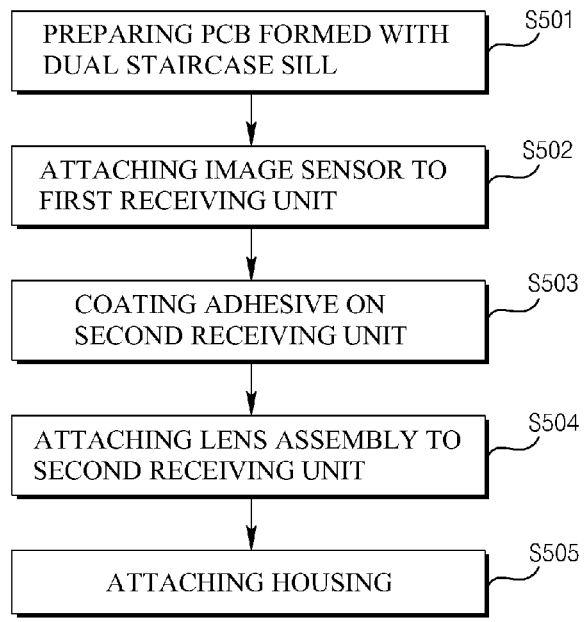
FIG. 11 is a flowchart illustrating a manufacturing method of a camera module according to a fourth exemplary embodiment of the present invention.

FIG. 11 is a flowchart illustrating a manufacturing method of a camera module according to a fourth exemplary embodiment of the present invention.

Referring to FIG. 11, a PCB having a dual staircase sill structure is prepared in which a first receiving unit is formed at an upper surface and a second receiving unit is formed at an upper side higher than the first receiving unit with a receiving area larger than that of the first receiving unit (S501).

An image sensor (200) is attached to a bottom surface of the first receiving unit (S502), and an adhesive coated to a staircase sill of the second receiving unit of the PCB (100) (S503). A lens assembly (300) is inserted into the second receiving unit of the PCB (100) coated with the adhesive for mutual attachment (S504).

A housing formed with a center hole at an upper center and having a bottom-opened inner space is prepared to align an optical axis of the lens assembly on the center hole and to fix a bottom end to an upper surface of the PCB (S505), where the steps of S503 and S504 may be reversed.

The image sensor may be attached to the image sensor (200) by a wire bonding in the step of attaching the image sensor (S502). However, the method is not limited thereto.

The staircase sill of the second receiving includes a vertical surface and a horizontal surface, and the adhesive may be coated to the horizontal surface or the vertical surface of the staircase sill in the step of coating the adhesive (S502). The adhesive may be epoxy. However, the adhesive is not limited to the epoxy.

Figure 12:
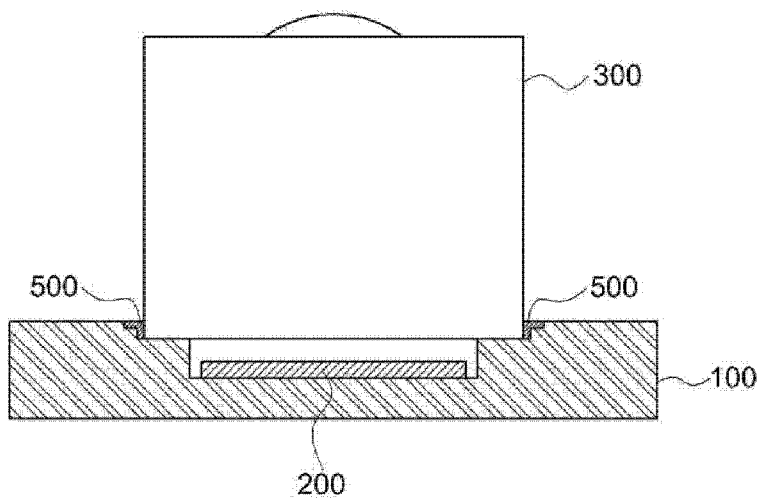
FIG. 12 is a cross-sectional view of another camera module according to a fourth exemplary embodiment of the present invention.

FIG. 12 is a cross-sectional view of another camera module according to a fourth exemplary embodiment of the present invention.

In a camera module formed with an image sensor (200), a PCB (100) and a lens assembly (300) according to a fourth exemplary embodiment of the present invention, the PCB (100) has a triple staircase sill structure in which a first receiving unit is formed at an upper surface and a second receiving unit is formed at an upper side higher than the first receiving unit with a receiving area larger than that of the first receiving unit, and a third receiving unit having a receiving area larger than that of second receiving unit, the image sensor (200) is accommodated and assembled at the first receiving unit, and a bottom end of the lens assembly is inserted into the second receiving unit, and a vertical surface at a staircase sill of the second receiving unit and an outer wall surface of the bottom surface of the lens assembly are coated with an adhesive, and a remnant of the adhesive is accommodated into the third receiving unit for mutual attachment.

The existence of the third receiving unit has an effect of preventing a surface of the PCB (100) from being polluted with the remnant of the adhesive. The adhesive may be an epoxy. However, the adhesive is not limited to the epoxy.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that a pressure to a lens of a lens assembly and an image sensor is evenly applied to reduce an outside shock, damage to an image sensor caused by contact between a lens assembly and an image sensor is prevented by an indirect contact between the lens assembly and the image sensor, and an optical axis is easily aligned.

The invention claimed is:

1. A camera module, the camera module comprising:
a PCB (Printed Circuit Board), an image sensor mounted on the PCB;
a housing, a bottom end of the housing fixed to an upper surface of the PCB, and the housing being a case formed with a lens hole at an upper wall and having a bottom-opened inner space;
a lens assembly having at least one lens aligned to the lens hole, wherein the lens assembly is fixed to and contacted with an upper surface of the image sensor and accommodated at the inner space of the housing;
and an elastic stiffening material disposed between the housing and the lens assembly;
wherein an upper surface of the elastic stiffening material is contacted with an inner surface of the upper wall of the housing, and a bottom surface of the elastic stiffening material is contacted with an upper surface of the lens assembly.

2. The camera module of claim 1, wherein at least a part of the elastic stiffening material is fixedly adhered to the inner surface of the upper wall of the housing.

3. The camera module of claim 1, further comprising an additional elastic stiffening material disposed between an inner surface of a lateral wall of the housing and an outer lateral surface of the lens assembly.

4. The camera module of claim 3, wherein at least a part of the elastic stiffening material is fixedly adhered to the inner surface of the lateral wall of the housing.

5. The camera module of claim 1, wherein the inner surface of the upper wall of the housing is formed with a recess portion having a shape corresponding with that of the elastic stiffening material,
wherein the elastic stiffening material is accommodated in the recess portion.

6. A camera module, the camera module comprising:
a PCB (Printed Circuit Board), an image sensor mounted on the PCB;
a housing, a bottom end of the housing fixed to an upper surface of the PCB, and the housing being a case formed with a lens hole at an upper surface and having a bottom-opened inner space; and
a lens assembly having at least one lens aligned to the lens hole by being disposed on an upper surface of the image sensor and accommodated at the inner space of the housing;
wherein an outer bottom end of the lens assembly is formed with a hollow hole in which an adhesive is disposed.

7. The camera module of claim 6, wherein a bottom surface of the lens assembly and an upper surface of the image sensor are at least partially surface-contacted, and are mutually adhered by an adhesive infused into the hollow hole.

8. The camera module of claim 6, wherein the adhesive filled at the outer bottom end of the lens assembly is epoxy.

9. The camera module of claim 6, wherein a plurality of hollow holes is formed along a periphery of the outer bottom end of the lens assembly, each hollow hole being discrete from each other.

10. The camera module of claim 6, wherein a plurality of hollow holes is continuously formed along a periphery of the outer bottom end of the lens assembly.

11. A camera module, the camera module comprising:
a PCB formed with a light transmission opening unit;
an image sensor having a larger plane surface than the light transmission opening unit of the PCB, and coupled to a bottom surface of the PCB;
a lens assembly having a larger plane surface than the light transmission opening unit of the PCB, wherein the lens assembly is contacted with an upper surface of the PCB for at least a portion of the lens assembly to face an upper surface of the image sensor through the light transmission opening; and
a housing accommodating the lens assembly;
wherein a bottom end of the housing is fixed to an upper surface of the PCB, and the housing is a case formed with a lens hole at an upper surface and having a bottom-opened inner space.

12. The camera module of claim 11, wherein the PCB and the lens assembly are mutually adhered by an adhesive.

13. The camera module of claim 12, wherein the adhesive is an epoxy.

14. The camera module of claim 11, wherein the PCB and the image sensor are mutually adhered by using a stud bump bonding, a wire bonding, an ADF (Anisotropic Conductive Film) or a hot bar.

15. The camera module of claim 11, wherein the PCB is an FR4 (Flame Retardant Type 4) PCB.

* * * * *